May 26, 1964  D. FIORENTINI  3,134,455
UNIVERSAL TRUCK WITH STEERING AND DRIVING WHEELS
Filed June 1, 1961
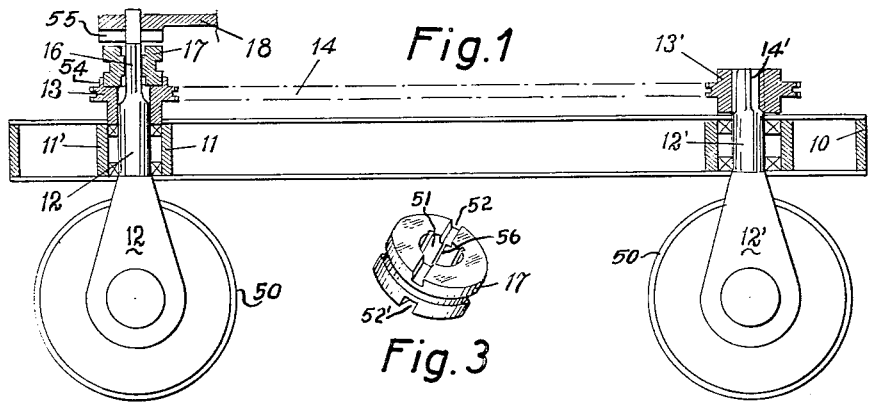
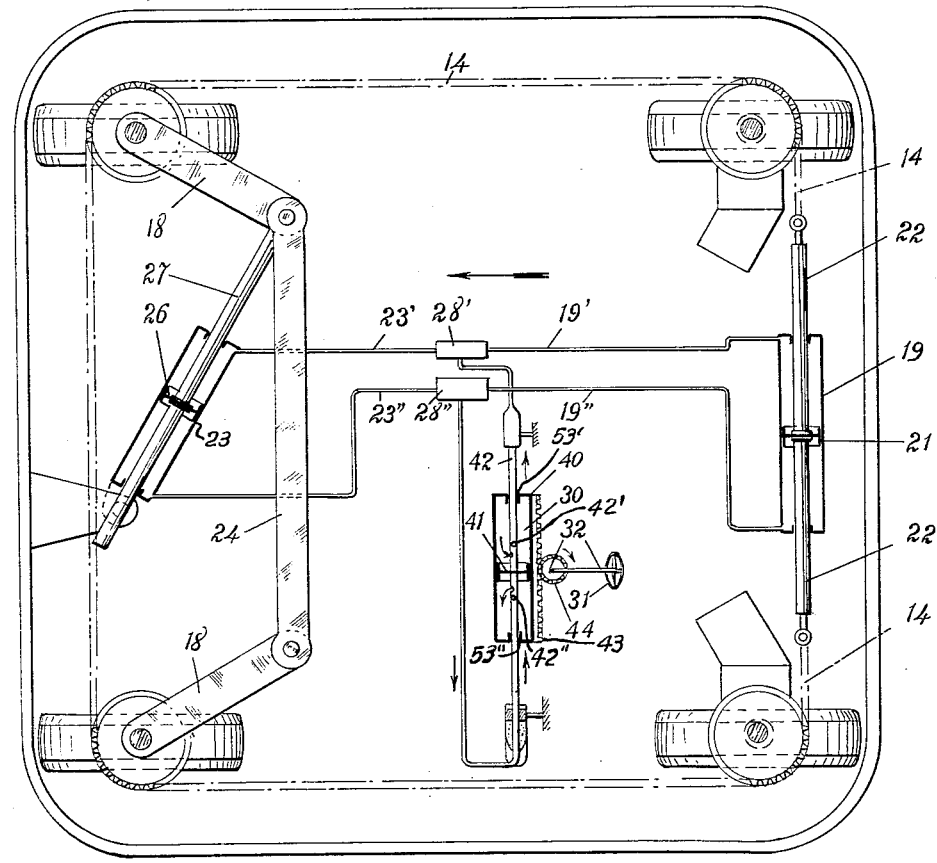
Fig.2
INVENTOR.
DINO FIORENTINI
BY
Richards & Geier
ATTORNEYS

United States Patent Office 3,134,455
Patented May 26, 1964

3,134,455
UNIVERSAL TRUCK WITH STEERING
AND DRIVING WHEELS
Dino Fiorentini, Corso Matteotti 11, Jesi, Italy
Filed June 1, 1961, Ser. No. 114,130
Claims priority, application Italy Jan. 28, 1961
4 Claims. (Cl. 180—79.2)

A need deeply felt in industry in general, and particularly in factories, construction yards, storage dumps and warehouses, is for a manoeuvrable, fast-moving and small-sized vehicle, adaptable to all possible practical tasks in moving, even by inches, masses of any weight which must be variously positioned, shifted and centered.

The invention disclosed herein was conceived to meet this need and, as will be demonstrated below, fully satisfies the requirements set forth above.

The main characteristic of the truck of the present invention lies in the fact that the platform is mounted on four wheels, all of which may be driving wheels, and all of which are steerable from a single control, so that the planes of rotation of the four wheels are always parallel to each other.

This characteristic of the steering system, while allowing the truck to move freely in every direction, does constrain its platform to remain in all cases parallel to the position of departure, so that it can move only along a broken line. Since such an arrangement of the steering mechanisms would create some difficulty in particular cases, such as for instance when driving on an ordinary road, provision is made for a device enabling the truck to be driven along curved lines, this being achieved by locking in fixed position one pair of wheels and steering by the other pair.

The truck built to the general design described above presents wholly novel properties and operating characteristics, since the wheels can be steered by angles in excess of 180° and therefore, being reversible in motion, enable the truck to move in all directions on a plane.

Another advantage of the invention lies in the fact that the truck will be powered preferably with an internal combustion engine or with an electric motor fed by a storage battery, either being used to drive a pump delivering a fluid under pressure, which will drive the wheels through one hydraulic motor attached to each wheel, such motors being fed through flexible pipes connected to a central distributing device.

Other features and advantages of the truck according to the invention will be evident from the following detailed description, which will be more clearly understood by referring to the enclosed drawing which represents, as a non-limiting example, a preferred embodiment thereof.

In the drawing:

FIG. 1 is an elevation view of the truck, partially sectioned;

FIG. 2 is a plan view, in which the steering components are shown partially in view and partially in cross-section;

FIG. 3 is a perspective view of an asymmetrical tooth coupling.

With reference to the figures, the truck, which in the example shown is square, so as to present the same dimension in all positions, consists of a chassis 10 fitted with cross-members 11 to which are attached, by known methods, bearings 11' which receive the vertical pivots of the four wheels 50. On pivots 12 of the front pair of wheels are mounted idly the gears 13, and equal gears 13' are mounted on pivots 12' of the rear wheels. The gears 13' are splined to the pivots 12', the pivots 12' being provided with splines 14' for that purpose. The upper ends of front wheel pivots 12 are machined to form splines 16, which enable a tooth coupling 17 (having a concentric bore hole 51 and circumferentially spaced slots 56 extending longitudinally of the bore hole 51) engaged thereon to assume two different positions with respect to gears 13 and the steering levers 18 above, mounted idly on pivots 12, and specifically: when couplings 17 are moved downwards, they engage by means of the recesses 52' on the bottom side thereof the upstanding projections 54 of gears 13 locking same to the wheel pivots: when moved upwards, recesses 52 therein engage matching projections 55 in steering levers 18, locking the latter to pivots 12 and leaving gears 13 idle.

A chain 14, passing around all four gears 13' and 13, when the latter are locked on pivots 12 by couplings 17, forces the wheel to remain on parallel rotation planes, and therefore to steer by precisely the same angle.

It is evident from the foregoing that the truck, with such an arrangement, can be steered in two different ways, depending on whether chain 14 controls, through gears 13 and 13', all four wheels, or whether instead only rear wheel gears 13' are locked on the pivots while gears 13 are not. In this latter case couplings 17 are moved upwards on front wheel pivots 12, and their recesses 52 mesh with the projections 55 of the two steering rods 18, which can steer the two front wheels independently of the rear wheels, because gears 13 remain idle on pivots 12.

Corresponding to these two ways of steering the truck, two control systems are provided, and specifically: when both gears 13 and 13' are locked on the wheel pivots, there is in operation a cylinder 19 which, by means of a piston 21 and stem 22, moves chain 14 on one of the sides by a sufficient distance to steer simultaneously all four wheels up to about 90° in either direction. In the other case, in which front wheel gears 12 are actuated by steering levers 18 rather than by gears 13, such levers constitute, together with tie rod 24, an articulated linkage actuated by a cylinder 23 which, by means of piston 26 and stem 27, moves levers 18 to the appropriate angle to cause the carriage to steer in the desired direction.

The said hydraulic cylinders 19 and 23 are double-acting, and the respective feed pipes 19'—19'' and 23'—23'' lead from two cocks or three-way valves 28' and 28'', which serve to send the fluid delivered by a pump 30 hand-powered by steering wheel 31 and post 32, selectively to either one or the other of the two cylinders 19 and 23. In other words, fluid delivered by pump 30 can be sent optionally to only one or the other of cylinders 19 and 23 at any given time. Thus, if it is desired to actuate cylinder 19, then valves 28' and 28'' are so set that the fluid delivered by pump 30 circulates along pipes 19' and 19'', while no flow occurs inside pipes 23' and 23''. If on the other hand, cylinder 23 is to be actuated, valves 28' and 28'' are set in a way that the fluid delivered by pump 30 does not flow along pipes 19' and 19'', but rather flows in pipes 23' and 23''. The actuation of valves 28' and 28'' (by hand) is appropriately synchronized with that of couplings 17 so that when the couplings are moved upwards (and therefore engaged with steering levers 18), cylinder 23 is turned on and 19 is turned off, and the opposite when the couplings 17 are moved downwards. It is evident that the two couplings 17 (and therefore valves 28' and 28'' synchronised therewith) must be simultaneously actuated they are preferably actuated by a single lever moved by a suitable mechanical or hydraulic drive, not shown Further illustrating the above, FIG. 1 shows the steering mechanism in a position wherein all four wheels 50 are steered simultaneously. The change from such condition into the alternative condition in which only the fron wheels are steerable, is achieved by lifting the toothed coupling 17 and bring it to engage the steering levers 18 and then actuating by hand, valves 28' and 28'' in order to exclude fluid delivered by pump 30 from cylinder 21 and allow it to flow only to cylinder 23. If the valves 28' and 28" are not so actuated after lifting coupling 17, the front wheels will remain locked while the rear wheels are steerable. Some vehicles are designed to travel in the last-mentioned condition, but in the present construction it is preferable to steer with the front wheels. Thus, it is specified that the movement of coupling 17 should be synchronised with the hand actuation of valves 28' and 28" in an appropriate manner.

Steering levers 18 will be mounted on front wheel pivots 12 at an appropriate angle, so that they can move freely within normal truck steering angle, say 30° right and left of the median position. During this angular movement of the steering lever; chain 14, engaging gears 13 and 13' cannot move, since cylinder 19 is shut off, thus maintaining fixed in the correct position the planes of rotation of the rear wheels.

Pump 30 can consist of a cylinder 40 and a piston 41 attached to a hollow stem 42 projecting from both ends of the cylinder through openings 53' and 53" and attached at both ends to the truck chassis. Cylinder 40 can be caused to move in either direction by a rack 43 attached to it and a gear 44 actuated by steering wheel 31 through post 32. In proximity of piston 41, stem 42 is provided with two apertures 42' and 42", on both sides of the piston, while its ends are atached to the pipes leading to the two three-way valves 28' and 28". It is obvious that, in lieu of the pump 30 described above, a power-steering system can be used, actuated by the same fluid which powers the drive wheels, or by a fluid delivered by a separate pump.

Another important feature of the invention lies in the fact that couplings 17 are asymmetrical, so that the passage from meshing with gears 13 to coupling with steering levers 18, and vice-vesa, can be accomplished in a single specific position of the wheels, i.e. when all four wheels have their rotation planes parallel to the normal straight-ahead running position of the truck.

What I claim is:

1. In a vehicle having a chassis frame which includes front and rear end portions, a pair of pivots rotatably supported in said chassis frame at the front end, a pair of pivots rotatably supported in said chassis frame at the rear end, said pivots extending vertically through said chassis frame, and wheels carried by each of said pivots for supporting said chassis frame in a substantially horizontal plane; a steering system for controlling the directional movement of the vehicle, said system comprising: a sprocket firmly connected to each of the rear pivots on said chassis frame; a sprocket loosely mounted on each of the front pivots on said chassis frame, each of the last-mentioned sprockets having parallel upper and lower surfaces, the upper surfaces having upstanding projections; a steering rod loosely mounted at one end on each of said front pivots and spaced axially a distance above the last-mentioned sprockets, said steering rods having parallel upper and lower surfaces, said lower surfaces having projections thereon; a tie-rod interconnecting the other ends of said steering rods; a coupling carried by each of said front pivots intermediate said steering rods and said last-mentioned sprockets, said couplings having parallel upper and lower surfaces, said upper and lower surfaces having recesses, said couplings further rotating with said front supported pivots and being slidable axially on said pivots from a first operative position wherein the lower surfaces thereof engage the upstanding projections on said last-mentioned sprockets to a second operative position wherein the upper surface recesses thereof engage the lower surface projections on said steering rods; means carried by said chassis frame and connected to said tie-rod for moving said tie-rod in a plane parallel to said chassis frame for effecting an identical angular rotation to said front pivots when said couplings are in a second operative position; an endless chain engaging all of said sprockets; and means carried by said chassis frame and operable to move said endless chain for effecting identical angular rotations in all of said pivots when said couplings are in a first operative position.

2. A steering system in accordance with claim 1 wherein the couplings on said front pivots have concentric bore holes, the bore holes containing a plurality of circumferentially spaced slots, and said front pivots have a plurality of longitudinally extending spline projections, the spline projections engaging the slots in said couplings.

3. A steering system in accordance with claim 1 wherein the recesses in the upper and lower surfaces of said couplings are in alignment with each other.

4. A steering system in accordance with claim 1 wherein the means for moving said tie rod and the means for moving said endless chain comprise hydraulic cylinders each having a double acting piston, said system further comprising a pump cylinder having openings at both ends, a hollow rod extending through said pump cylinder and beyond said openings, said last mentioned rod having a pair of spaced apertures within said pump cylinder, a piston fixed to said last-mentioned rod between said apertures and separating said pump cylinder into separate pump chambers, a toothed rack carried by said pump cylinder, a pinion engaging said rack, means for rotating said pinion whereby said cylinder may be moved axially in each of two opposite directions for effecting a pressure flow in each of said pump chambers, conduit means connecting each of said pump chambers to said hydraulic cylinders and control means for selectively controlling pressure flow to the opposite faces of said double acting pistons.

References Cited in the file of this patent

UNITED STATES PATENTS

| | | |
|---|---|---|
| 693,994 | Bowker | Feb. 25, 1902 |
| 859,235 | Macfarren | July 9, 1907 |
| 2,029,540 | Porteous | Feb. 4, 1936 |